United States Patent
Chi et al.

(10) Patent No.: US 8,300,670 B2
(45) Date of Patent: *Oct. 30, 2012

(54) METHOD FOR DERIVING PRECISE CONTROL OVER LASER POWER OF AN OPTICAL PICKUP UNIT, AND ASSOCIATED AUTOMATIC POWER CALIBRATION CIRCUIT

(75) Inventors: Hsiao-Yuan Chi, Taipei (TW); Chih-Ching Chen, Miaoli County (TW); Chia-Wei Liao, Hsinchu County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/166,817

(22) Filed: Jun. 23, 2011

(65) Prior Publication Data

US 2011/0255566 A1    Oct. 20, 2011

Related U.S. Application Data

(63) Continuation of application No. 12/195,414, filed on Aug. 21, 2008, now Pat. No. 7,991,030.

(60) Provisional application No. 60/991,185, filed on Nov. 29, 2007.

(51) Int. Cl.
*H01S 3/00*    (2006.01)
(52) U.S. Cl. .................... 372/38.02; 372/38.1
(58) Field of Classification Search .............. 372/38.1, 372/38.02; 369/47.5
See application file for complete search history.

(56) References Cited

U.S. PATENT DOCUMENTS

| | | | |
|---|---|---|---|
| 5,109,367 A * | 4/1992 | Yoshikawa | 369/44.25 |
| 5,138,623 A | 8/1992 | Ema | |
| 6,359,847 B1 * | 3/2002 | Shimizu | 369/53.26 |
| 6,882,610 B2 | 4/2005 | Tseng | |
| 6,898,223 B2 | 5/2005 | Seo | |
| 7,411,885 B2 | 8/2008 | Liu | |
| 7,991,030 B2 * | 8/2011 | Chi et al. | 372/38.02 |
| 2002/0122359 A1 | 9/2002 | Yoshida | |
| 2002/0172242 A1 * | 11/2002 | Seo | 372/29.02 |
| 2005/0058053 A1 * | 3/2005 | Ueno et al. | 369/116 |
| 2005/0105412 A1 | 5/2005 | Lai | |
| 2005/0226293 A1 | 10/2005 | Yeh | |
| 2006/0072634 A1 | 4/2006 | Daiber | |

(Continued)

FOREIGN PATENT DOCUMENTS

CN    1387187 A    12/2002

(Continued)

*Primary Examiner* — Jessica Stultz
*Assistant Examiner* — Phillip Nguyen
(74) *Attorney, Agent, or Firm* — Winston Hsu; Scott Margo

(57) ABSTRACT

A method for deriving precise control over laser power of an optical pickup unit (OPU) includes: providing an analog-to-digital converter (ADC) within an automatic power calibration (APC) circuit to derive a path gain and/or a path offset from the APC circuit; and selectively performing compensation according to the gain and/or the path offset, in order to maintain precision of a relationship between the laser power and a target command utilized for controlling the laser power. An associated APC circuit comprising an ADC and at least one compensation module is further provided. The ADC is utilized for deriving a path gain and/or a path offset from the APC circuit. The compensation module is utilized for selectively performing compensation according to the path gain and/or the path offset, in order to control the laser power by a target command.

14 Claims, 3 Drawing Sheets

U.S. PATENT DOCUMENTS

| | | |
|---|---|---|
| 2006/0126478 A1 | 6/2006 | Stan |
| 2007/0019529 A1 | 1/2007 | Ho |
| 2007/0053395 A1* | 3/2007 | Kamatani et al. .......... 372/38.02 |
| 2007/0121446 A1 | 5/2007 | Shiozawa |
| 2007/0140081 A1 | 6/2007 | Yang et al. |
| 2007/0291613 A1* | 12/2007 | Liao et al. ................. 369/59.21 |
| 2007/0291620 A1 | 12/2007 | Yu |
| 2009/0141755 A1 | 6/2009 | Chi |

FOREIGN PATENT DOCUMENTS

| | | |
|---|---|---|
| CN | 1614698 | 5/2005 |
| TW | 200409096 | 6/2004 |
| TW | 200600876 | 1/2006 |

\* cited by examiner

METHOD FOR DERIVING PRECISE CONTROL OVER LASER POWER OF AN OPTICAL PICKUP UNIT, AND ASSOCIATED AUTOMATIC POWER CALIBRATION CIRCUIT

CROSS REFERENCE TO RELATED APPLICATIONS

This application is a continuation application and claims the benefit of U.S. application Ser. No. 12/195,414, which was filed on Aug. 21, 2008, and entitled "METHOD FOR DERIVING PRECISE CONTROL OVER LASER POWER OF AN OPTICAL PICKUP UNIT, AND ASSOCIATED AUTOMATIC POWER CALIBRATION CIRCUIT". In addition, the aforementioned U.S. application Ser. No. 12/195,414 claims the benefit of U.S. Provisional Application No. 60/991,185, which was filed on Nov. 29, 2007, and entitled "AUTO POWER CALIBRATION STRUCTURAL".

BACKGROUND

The present invention relates to power calibration of an optical pickup unit (OPU) with respect to a target command during a mass production phase of an optical disc drive, and more particularly, to a method for deriving precise control over laser power of an OPU, and to an associated automatic power calibration (APC) circuit.

Regarding the control over an OPU of an optical disc drive in the related art, a conventional APC circuit can be utilized for controlling the laser power of a laser diode (LD) during a normal operation of the optical disc drive, e.g. a reading/writing operation. When the conventional APC circuit reaches a steady state during the normal operation mentioned above, the laser power corresponds to a target command sent to the conventional APC circuit. It is a goal for the conventional APC circuit to control the laser power to be a specific power value corresponding to the target command, in order that the laser power varies in accordance with the target command. Sometimes, the goal mentioned above appears to be too idealized to achieve, the reason for which is described as follows.

A conventional method for deriving the relationship between the laser power and the target command typically comprises measuring the laser power by utilizing a power meter, and collecting data sets of the laser power and the target command. However, the cost of the power meter is high, and the corresponding tooling and labor costs of a power calibration station for implementing this method are also required. Additionally, another issue such as the differences between respective power calibration stations may arise.

According to the related art, an OPU vendor may design a front-end photo diode (PD) in an OPU, and the manufacturers (e.g. an optical disc drive manufacturer) uses the front-end PD as a replacement for the power meter. The measurement result from the front-end PD is outputted through a front-end PD output (FPDO), and can be referred to as the FPDO value. Some examples of curves of a relationship between the laser power of the OPU and the FPDO value are illustrated in FIG. 1. As shown in FIG. 1, the curve passing through the origin corresponds to an ideal case, and the other two curves correspond to a real case with a positive offset and another real case with a negative offset.

As the OPU vendor typically provides a few data points for stating the relationship between the laser power and the FPDO value, interpolation operations are required for deriving the laser power corresponding to other data points on a predicted curve passing through the few data points mentioned above. As a result, the whole process of deriving a precise relationship between the laser power and the target command is slowed down due to the interpolation operations.

In addition, when trying to derive the relationship as mentioned with the laser power having a duty cycle such as 50% (e.g. the 50% duty cycle write power), it is very hard to accurately measure a direct current (DC) component by utilizing the FPDO value due to various hardware limitations, e.g. analog bandwidth.

Additionally, the gain and the offset of the conventional APC circuit may vary from chip to chip, and the overall gain and the overall offset of the combination of the OPU and the conventional APC circuit may also vary from system to system. Thus, when using the FPDO, the plan of deriving a precise relationship between the laser power and the target command does not work well in practice.

SUMMARY

It is therefore an objective of the claimed invention to provide a method for deriving precise control over laser power of an optical pickup unit (OPU), and to provide an associated automatic power calibration (APC) circuit, in order to solve the above-mentioned problems.

It is another objective of the claimed invention to provide a method for deriving precise control over laser power of an OPU, and to provide an associated APC circuit, in order to derive a precise relationship between the laser power and a target command for controlling the laser power.

An exemplary embodiment of a method for deriving precise control over laser power of an OPU comprises: providing an analog-to-digital converter (ADC) within an APC circuit to derive a path gain and/or a path offset from the APC circuit; and selectively performing compensation according to the gain and/or the path offset, in order to control the laser power by a target command. In particular, the step of selectively performing compensation according to the path gain and/or the path offset further comprises: compensating the path gain when the path gain is derived; and canceling the path offset when the path offset is derived.

An exemplary embodiment of an APC circuit for controlling laser power of an OPU comprises an ADC and at least one compensation module that is coupled to the ADC. The ADC is utilized for performing analog-to-digital conversion, and further utilized for deriving a path gain and/or a path offset from the APC circuit. The compensation module is utilized for selectively performing compensation according to the path gain and/or the path offset, in order to maintain precision of a relationship between the laser power and a target command utilized for controlling the laser power. In particular, the APC circuit further comprises a control unit arranged to control the APC circuit, wherein the control unit controls the APC circuit to compensate the path gain when the path gain is derived, and controls the APC circuit to cancel the path offset when the path offset is derived.

An exemplary embodiment of a method for deriving precise control over laser power of an OPU comprises: providing an ADC within an APC circuit to derive a path offset from the APC circuit; and selectively performing compensation according to the path offset, in order to control the laser power by a target command.

An exemplary embodiment of an APC circuit for controlling laser power of an OPU comprises an ADC and at least one compensation module that is coupled to the ADC. The ADC is utilized for performing analog-to-digital conversion, and further utilized for deriving a path offset from the APC circuit. The compensation module is utilized for selectively performing compensation according to the path offset, in order to maintain precision of a relationship between the laser power and a target command utilized for controlling the laser power.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
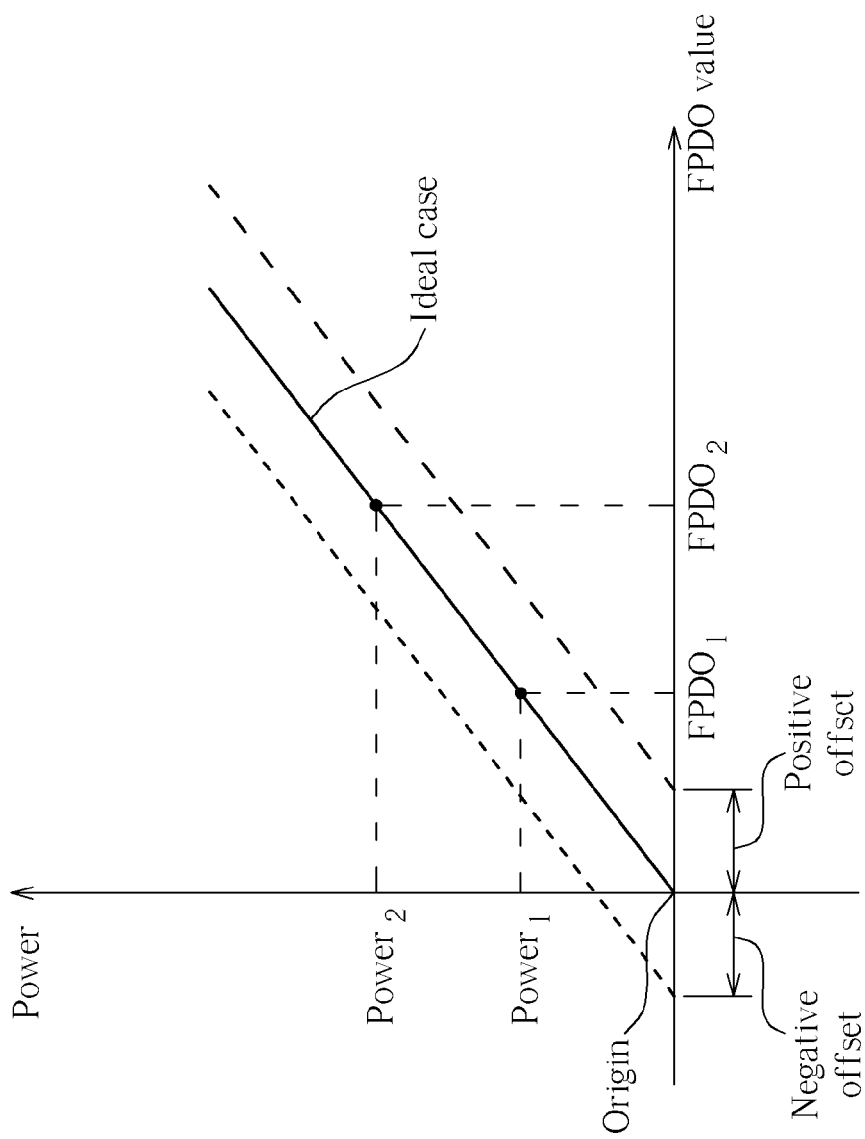
FIG. 1 illustrates curves of a relationship between laser power of an optical pickup unit (OPU) and a front-end PD output (FPDO) value outputted from an FPDO of an OPU according to the related art.
Figure 2:
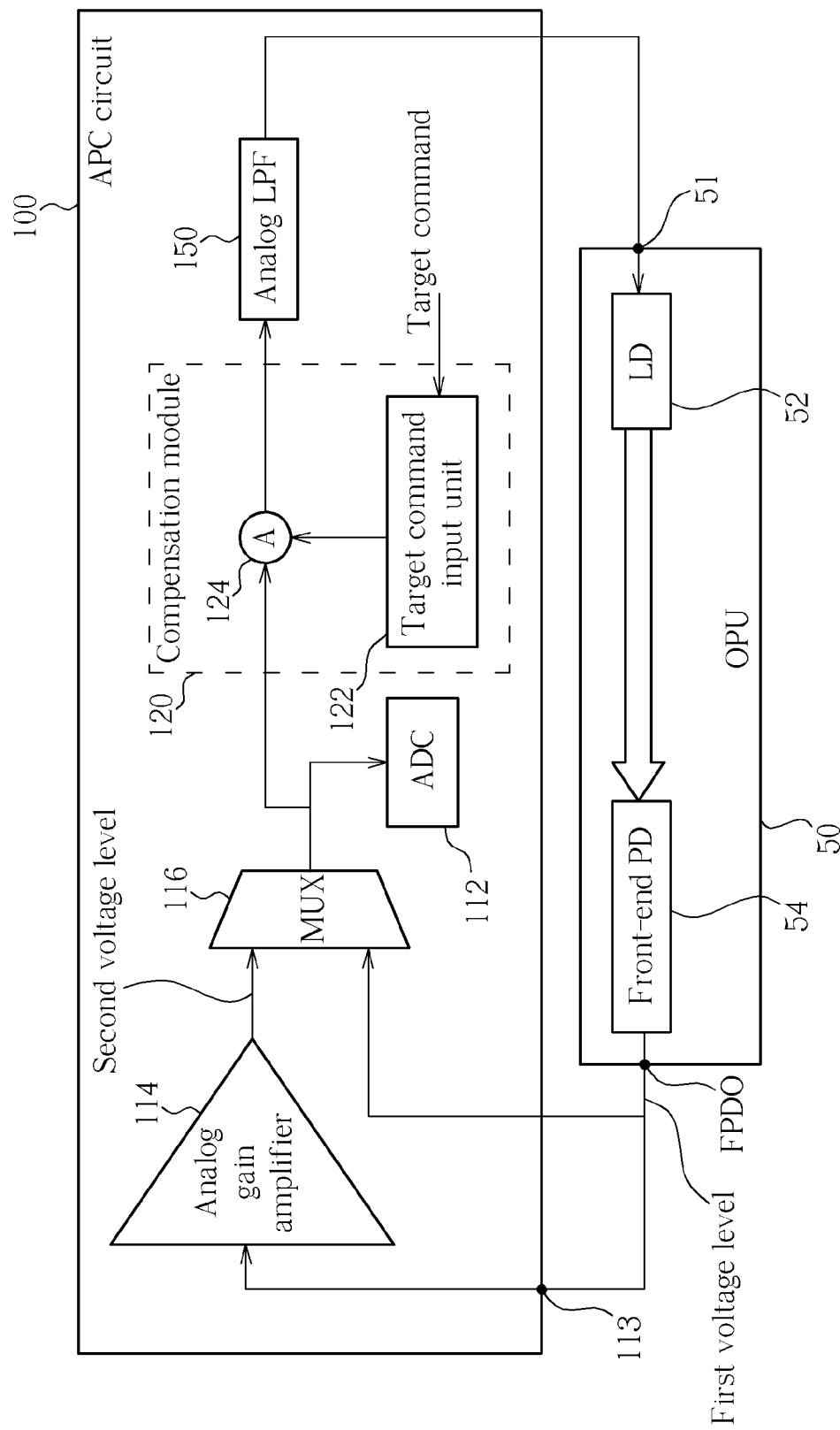
FIG. 2 is a diagram of an automatic power calibration (APC) circuit for controlling laser power of an OPU according to a first embodiment of the present invention.

Please refer to FIG. 2. FIG. 2 is a diagram of an automatic power calibration (APC) circuit 100 for controlling laser power of an optical pickup unit (OPU) 50 according to a first embodiment of the present invention. The OPU 50 is typically positioned in an optical disc drive such as a compact disc-read only memory (CD-ROM) drive, a digital versatile disc (DVD) drive, HD-DVD drive, etc., where the OPU 50 is a component that is well known in the related art.

In addition to the APC circuit 100 mentioned above, the present invention further provides a method for deriving precise control over laser power of an OPU. The method can be applied to the APC circuit 100 and implemented by utilizing the APC circuit 100, and is described as follows.

As shown in FIG. 2, the APC circuit 100 comprises an analog-to-digital converter (ADC) 112, an analog gain amplifier 114 and a multiplexer 116 (labeled "MUX"), and further comprises at least one compensation module such as a compensation module 120. In this embodiment, the compensation module 120 comprises a target command input unit 122 and an arithmetic unit 124.

According to this embodiment, the ADC is utilized for performing analog-to-digital conversion, and further utilized for deriving a path gain and/or a path offset from the APC circuit 100. Please note that the path offset mentioned above typically represents an overall offset due to the OPU 50 and the APC circuit 100. In practice, the APC circuit 100 can be implemented with a chip mounted on a printed circuit board (PCB), and therefore, the path offset represents an overall offset due to the OPU 50, the chip and the PCB.

In addition, the compensation module 120 cooperated with the multiplexer 116 is utilized for "selectively" performing compensation according to the path gain and/or the path offset, in order to maintain precision of a relationship between the laser power and a target command utilized for controlling the laser power, where the meaning of the adverb "selectively" will be explained later.

According to this embodiment, the path gain and/or the path offset are derived from the APC circuit 100 to complete a configuration of the APC circuit 100 when designing/manufacturing an electronic device comprising the OPU 50 and the APC circuit 100. In this embodiment, the electronic device mentioned above may represent an optical disc drive such as that mentioned above, represent a video playback device comprising a disc-accessing module capable of reading an optical disc such as a CD-ROM, DVD, HD-DVD, etc., or represent a digital video recorder (DVR) comprising a disc-accessing module capable of accessing an optical disc.

The APC circuit 100 of this embodiment further comprises a control unit (not shown) arranged to control the APC circuit 100, where various implementation choices can be applied. For example, the control unit can be a micro-processing unit (MPU) executing a program code such as a firmware code for realizing a complete operation of the APC circuit 100, where the MPU is typically implemented in an individual chip or in the same architecture (e.g. the same chip) with those components of the APC circuit 100 shown in FIG. 2. In another example, the control unit can be a dedicated hardware controller executing a hardware code for realizing the complete operation of the APC circuit 100, where the dedicated hardware controller is typically implemented in the same architecture (e.g. the same chip) with those components of the APC circuit 100 shown in FIG. 2.

No matter which implementation choice is applied to the control unit mentioned above, the control unit controls the APC circuit 100 to compensate the path gain when the path gain is derived, and controls the APC circuit 100 to cancel the path offset when the path offset is derived. In most of the cases that are encountered, the path gain deviates from a design gain value and the path offset is non-zero. Thus, compensating the path gain and canceling the path offset are both required. Only in a very few cases, the path gain is substantially equal to the design gain value or the path offset is zero. In general, the compensation module 120 "selectively" performs compensation according to the path gain and/or the path offset.

In this embodiment, the analog gain amplifier 114 is arranged to receive a first voltage level and generate a second voltage level accordingly, and is utilized for applying a specific gain value to the first voltage level. In an ideal case, the specific gain value is substantially a design gain value such as that mentioned above. In most of the cases that are encountered, the specific gain value deviates from the design gain value.

In addition, the multiplexer 116 is arranged to multiplex the first voltage level or the second voltage level according to the control of the control unit. When the multiplexer 116 multiplexes the first voltage level, the ADC 112 converts the first voltage level into a first value. When the multiplexer 116 multiplexes the second voltage level, the ADC 112 converts the second voltage level into a second value. The control unit mentioned above thus calculates a ratio of the second value to the first value to derive the path gain.

According to the method mentioned above, various configuration conditions (i.e. conditions for configuring the APC circuit 100) can be applied to the APC circuit 100 to derive the path gain and the path offset.

The configuration conditions for deriving the path gain are described as follows. For example, in one of the configuration conditions, an input terminal 113 for receiving the first voltage level is temporarily isolated from the OPU 50 (i.e. an open loop is formed regarding the APC circuit 100 and the OPU 50). Thus, the path gain can be derived by applying a specific voltage level as the first voltage level. In a power calibration station for implementing this configuration condition, the specific voltage level can be outputted from a power supply. As a result, the path gain is substantially equal to the ratio of the second value to the first value.

According to this configuration condition, the specific voltage level is outputted from the power supply of inexpensive price as mentioned. This is for illustrative purposes only, and is not meant to be a limitation of the present invention. According to another configuration condition for deriving the path gain, the specific voltage level can be derived from a specific component within the aforementioned chip for implementing the APC circuit 100. For example, the specific component can be a level shifter. In another example, the specific component can be a regulator. Similar descriptions for this configuration condition are not repeated in detail here.

Regarding another configuration condition, the input terminal 113 of the analog gain amplifier 114 is temporarily coupled to a front-end PD output (FPDO) of a front-end PD 54 within the OPU 50 as shown in FIG. 2 (i.e. a closed loop is formed by the APC circuit 100 and the OPU 50). Thus, the path gain can be derived by applying a specific value as the target command. In this configuration condition, the specific value should enable a laser diode (LD) 52 of the OPU 50 to emit a laser. In order to prevent interference due to noise, it would be better that the laser power is not too small.

In addition, the second value is derived after the APC circuit 100 enters a second steady state with the second voltage level (generated from the analog gain amplifier 114) being multiplexed by the multiplexer 116, and the first value can be derived just after the second value is derived. Additionally, the first value is derived after the APC circuit 100 enters a first steady state with the first voltage level being multiplexed by the multiplexer 116. As a result, the path gain is substantially equal to the ratio of the second value (which is derived in the second steady state in this configuration condition) to the first value (which is derived in the first steady state when the multiplexer 116 switches as mentioned in this configuration condition).

According to this configuration condition, the first value is derived just after the second value is derived. This is for illustrative purposes only, and is not meant to be a limitation of the present invention. According to another configuration condition for deriving the path gain, the order for deriving the first value and the second value is changed. For example, the second value can be derived just after the first value is derived. Similar descriptions for this configuration condition are not repeated in detail here.

The configuration conditions for deriving the path offset are further described as follows. For example, in one of the configuration conditions, a driving terminal 51 of the LD 52 is temporarily isolated from the APC circuit 100 (i.e. an open loop is formed regarding the APC circuit 100 and the OPU 50). Thus, the driving signal can be applied to the driving terminal 51, where the driving signal has a voltage level that is close to or substantially equal to a ground level. In this configuration condition, the input terminal 113 is temporarily coupled to the FPDO of the OPU 50, and the multiplexer 116 multiplexes the second voltage level (generated from the analog gain amplifier 114). As a result, the ADC 112 converts a derivative of the second voltage level (i.e. the second voltage level multiplexed by the multiplexer 116 in this configuration condition) into a third value to derive the path offset. More specifically, the path offset is substantially equal to the third value.

Regarding another configuration condition, the input terminal 113 is temporarily coupled to the FPDO of the OPU 50 as shown in FIG. 2 (i.e. a closed loop is formed by the APC circuit 100 and the OPU 50). Thus, another specific value can be applied as the target command to derive the path offset. In this condition to derive the path offset, the specific value should disable the LD 52 (e.g. the specific value causes a voltage level of a driving signal of the LD 52 to be lower than 0.7 volts), so the LD 52 does not emit the laser. In addition, the multiplexer 116 multiplexes the second voltage level. As a result, the ADC 112 converts a derivative of the second voltage level (i.e. the second voltage level multiplexed by the multiplexer 116 in this configuration condition) into the third value such as that mentioned above to derive the path offset. More specifically, the path offset is substantially equal to the third value after the APC circuit 100 enters a third steady state.

After deriving the path gain and/or the path offset as mentioned in one or more configuration conditions, the control unit mentioned above stores the path gain and/or the path offset for being utilized in a normal APC operation of the APC circuit 100. For example, the control unit may store the path gain and the path offset into a non-volatile memory. After the configuration of the APC circuit 100 is completed, the normal APC operation can be performed for precisely controlling the laser power.

In the normal APC operation, a compensated target value can be calculated and dynamically adjusted in real time according to the path gain and the path offset, and is expressed as follows:

$$TC_A(t) = FPDO(t)*PG - PO;$$

where $TC_A(t)$ represents the compensated target value in analog type, $FPDO(t)$ represents the FPDO value derived online, PG and PO respectively represent the path gain and the path offset, and t is an index corresponding to time.

According to this embodiment, the target command input unit 122 is utilized for inputting the target command, and the arithmetic unit 124 is utilized for performing a subtraction operation according to a target command representative (i.e. a representative of the target command) outputted from the target command input unit 122 and the voltage level outputted from the multiplexer 116. For example, the arithmetic unit 124 subtracts the target command representative from the voltage level.

Therefore, in the normal APC operation, the control unit mentioned above dynamically applies the compensated target value $TC_A(t)$ as the target command, and inputs the target command into the target command input unit 122. The analog low pass filter (LPF) 150 shown in FIG. 2 is a component well known in the related art, and therefore, not explained in detail here.

Figure 3:
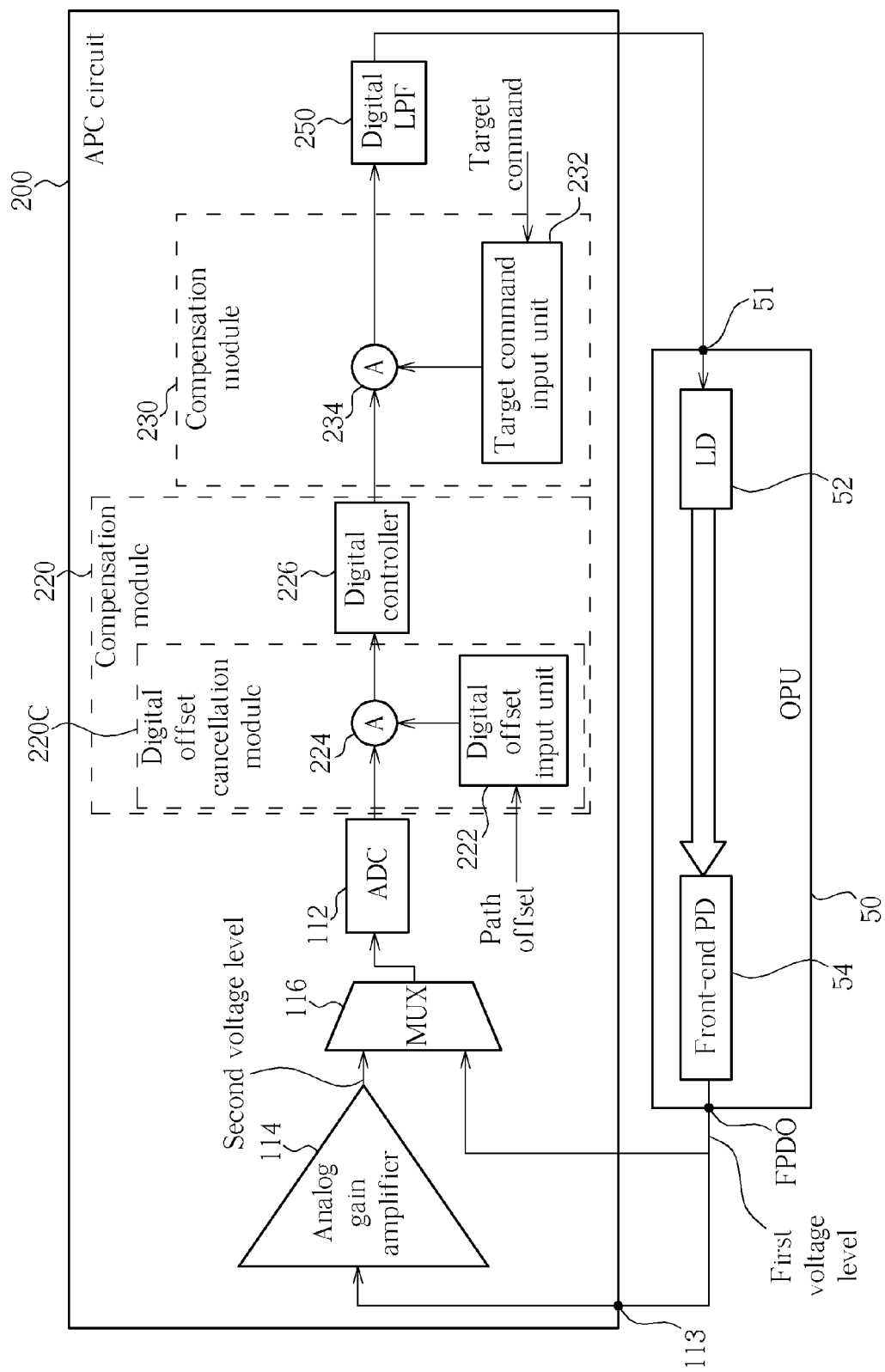
FIG. 3 is a diagram of an APC circuit for controlling laser power of an OPU according to a second embodiment of the present invention.

FIG. 3 is a diagram of an APC circuit 200 for controlling laser power of an OPU such as the OPU 50 according to a second embodiment of the present invention. This embodiment is a variation of the first embodiment, where some of the components shown in FIG. 2 are replaced. As shown in FIG. 3, in addition to the ADC 112, the analog gain amplifier 114 and the multiplexer 116, the APC circuit 200 further comprises a plurality of compensation modules 220 and 230. According to this embodiment, a digital offset cancellation module 220C of the compensation module 220 (i.e. a digital offset input unit 222 and an arithmetic unit 224) and the compensation module 230 are respectively implemented with a digital version of the compensation module 120. In addition to the digital offset input unit 222 and the arithmetic unit 224, the compensation module 220 further comprises a digital controller 226.

In the normal APC operation, the control unit mentioned above applies the path offset to the digital offset cancellation module 220C through the digital offset input unit 222, so the digital offset cancellation module 220C digitally cancels the path offset by utilizing the arithmetic unit 224. More specifically, the digital offset cancellation module 220C performs an arithmetic operation by utilizing the arithmetic unit 224 to cancel the path offset, where the arithmetic operation is performed with digital value calculations. Here, the arithmetic operation can be achieved by subtracting the path offset from a digital value outputted by the ADC 112 to generate a digital value as the output of the digital offset cancellation module 220C.

In addition, the digital controller 226 digitally compensates the path gain. More specifically, the digital controller 226 performs a compensation operation with digital value calculations to compensate the path gain. Here, the compensation operation can be achieved by multiplying a digital value from the arithmetic unit 224 by the path gain to generate a digital value as the output of the digital controller 226. Thus, the control unit mentioned above applies a compensated target value as the target command, where the compensated target value can be expressed as follows:

$$TC_D(t)=FPDO(t)*DG;$$

where $TC_D(t)$ represents the compensated target value in digital type, $FPDO(t)$ represents the FPDO value derived online, DG represents the design gain value, and t is still an index corresponding to time.

Therefore, in the normal APC operation, the control unit mentioned above dynamically applies the compensated target value $TC_D(t)$ as the target command, and inputs the target command into the target command input unit 232. The arithmetic unit 234 is similar to the arithmetic unit 224. The digital LPF 250 shown in FIG. 3 is a component well known in the related art, and therefore not explained in detail here.

In contrast to the related art, the present invention method and associated APC circuit can save the time and related costs required for a power calibration station such as that mentioned above.

It is another advantage of the claimed invention that the present invention method and associated APC circuit can derive a precise relationship between the laser power and a target command for controlling the laser power without utilizing a power meter. Thus, related costs can be saved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for deriving precise control over laser power of an optical pickup unit (OPU), the method comprising:
providing an analog-to-digital converter (ADC) within an automatic power calibration (APC) circuit to derive a path gain and/or a path offset from the APC circuit; and
selectively performing compensation according to the path gain and/or the path offset, in order to control the laser power by a target command, wherein the step of selectively performing compensation according to the path gain and/or the path offset further comprises:
compensating the path gain when the path gain is derived; and
canceling the path offset when the path offset is derived;
wherein the OPU comprises a front-end PD output (FPDO) for outputting an FPDO value; and the method further comprises:
applying a compensated target value as the target command, wherein the compensated target value is substantially equal to a product of the FPDO value and the path gain minus the path offset.

2. The method of claim 1, wherein the APC circuit comprises an analog gain amplifier for generating a second voltage level according to a first voltage level; the analog gain amplifier has an input terminal for receiving the first voltage level; and the method further comprises:
applying a driving signal to a driving terminal of a laser diode (LD) of the OPU with the driving terminal being temporarily isolated from the APC circuit, wherein the driving signal has a voltage level that is close to or substantially equal to a ground level; and
with the input terminal being temporarily coupled to the FPDO of the OPU, converting the second voltage level or a derivative thereof into a third value by utilizing the ADC to derive the path offset.

3. The method of claim 1, wherein the APC circuit comprises an analog gain amplifier for generating a second voltage level according to a first voltage level; the analog gain amplifier has an input terminal for receiving the first voltage level; and the method further comprises:
with the input terminal being temporarily coupled to the FPDO of the OPU, applying a specific value and converting the second voltage level or a derivative thereof into a third value by utilizing the ADC to derive the path offset;
wherein the path offset is substantially equal to the third value after the APC circuit enters one of a plurality of steady states thereof.

4. The method of claim 1, further comprising:
performing an arithmetic operation with digital value calculations to cancel the path offset; and
performing a compensation operation with digital value calculations to compensate the path gain;
wherein the compensated target value is substantially equal to a product of the FPDO value and a design gain value of an analog gain amplifier of the APC circuit.

5. A method for deriving precise control over laser power of an optical pickup unit (OPU), the method comprising:
providing an analog-to-digital converter (ADC) within an automatic power calibration (APC) circuit to derive a path gain and/or a path offset from the APC circuit; and
selectively performing compensation according to the path gain and/or the path offset, in order to control the laser power by a target command, wherein the step of selectively performing compensation according to the path gain and/or the path offset further comprises:
compensating the path gain when the path gain is derived; and
canceling the path offset when the path offset is derived;
wherein the APC circuit comprises an analog gain amplifier for generating a second voltage level according to a first voltage level; and the method further comprises:
multiplexing the first voltage level;
converting the first voltage level into a first value by utilizing the ADC;

multiplexing the second voltage level;
converting the second voltage level into a second value by utilizing the ADC; and
calculating a ratio of the second value to the first value in order to derive the path gain.

6. The method of claim 5, wherein the analog gain amplifier has an input terminal for receiving the first voltage level; and the method further comprises:
applying a specific voltage level as the first voltage level with the input terminal being temporarily isolated from the OPU.

7. The method of claim 5, wherein the analog gain amplifier has an input terminal for receiving the first voltage level; and the method further comprises:
applying a specific value as the target command with the input terminal being temporarily coupled to a front-end PD output (FPDO) of the OPU;
wherein the second value is derived after the APC circuit enters a second steady state with the second voltage level being multiplexed, and the first value is derived after the APC circuit enters a first steady state with the first voltage level being multiplexed.

8. An automatic power calibration (APC) circuit for controlling laser power of an optical pickup unit (OPU), the APC circuit comprising:
an analog-to-digital converter (ADC) for performing analog-to-digital conversion, wherein the ADC is utilized for deriving a path gain and/or a path offset from the APC circuit;
at least one compensation module, coupled to the ADC, for selectively performing compensation according to the path gain and/or the path offset, in order to maintain precision of a relationship between the laser power and a target command utilized for controlling the laser power; and
a control unit arranged to control the APC circuit, wherein the control unit controls the APC circuit to compensate the path gain when the path gain is derived, and controls the APC circuit to cancel the path offset when the path offset is derived;
wherein the OPU comprises a front-end PD output (FPDO) for outputting an FPDO value; and the control unit applies a compensated target value as the target command, wherein the compensated target value is substantially equal to a product of the FPDO value and the path gain minus the path offset.

9. The APC circuit of claim 8, wherein a driving signal is applied to a driving terminal of a laser diode (LD) of the OPU with the driving terminal being temporarily isolated from the APC circuit, and the driving signal has a voltage level that is close to or substantially equal to a ground level; and the APC circuit further comprises:
an analog gain amplifier arranged to generate a second voltage level according to a first voltage level, wherein the analog gain amplifier has an input terminal for receiving the first voltage level;
wherein in a situation where the input terminal is temporarily coupled to the FPDO of the OPU, the ADC converts the second voltage level or a derivative thereof into a third value to derive the path offset.

10. The APC circuit of claim 9, wherein the path offset is substantially equal to the third value after the APC circuit enters one of a plurality of steady states.

11. The APC circuit of claim 8, wherein the APC circuit further comprises:
a digital offset cancellation module arranged to perform an arithmetic operation with digital value calculations to cancel the path offset; and
a digital controller arranged to perform a compensation operation with digital value calculations to compensate the path gain;
wherein the compensated target value is substantially equal to a product of the FPDO value and a design gain value of an analog gain amplifier of the APC circuit.

12. An automatic power calibration (APC) circuit for controlling laser power of an optical pickup unit (OPU), the APC circuit comprising:
an analog-to-digital converter (ADC) for performing analog-to-digital conversion, wherein the ADC is utilized for deriving a path gain and/or a path offset from the APC circuit;
at least one compensation module, coupled to the ADC, for selectively performing compensation according to the path gain and/of the path offset, in order to maintain precision of a relationship between the laser power and a target command utilized for controlling the laser power;
a control unit arranged to control the APC circuit, wherein the control unit controls the APC circuit to compensate the path gain when the path gain is derived, and controls the APC circuit to cancel the path offset when the path offset is derived;
an analog gain amplifier arranged to generate a second voltage level according to a first voltage level; and
a multiplexer arranged to multiplex the first voltage level or multiplex the second voltage level;
wherein the ADC converts the first voltage level into a first value and further converts the second voltage level into a second value; and a ratio of the second value to the first value is calculated in order to derive the path gain.

13. The APC circuit of claim 12, wherein the analog gain amplifier has an input terminal for receiving the first voltage level; and the path gain is derived by applying a specific voltage level as the first voltage level with the input terminal being temporarily isolated from the OPU.

14. The APC circuit of claim 12, wherein the analog gain amplifier has an input terminal for receiving the first voltage level; the path gain is derived by applying a specific value as the target command with the input terminal being temporarily coupled to a front-end PD output (FPDO) of the OPU; and the second value is derived after the APC circuit enters a second steady state with the second voltage level being multiplexed by the multiplexer, and the first value is derived after the APC circuit enters a first steady state with the first voltage level being multiplexed by the multiplexer.

* * * * *